Nov. 6, 1928.
G. A. JAMERSON
1,690,636
LUBRICATOR
Filed Nov. 19, 1925
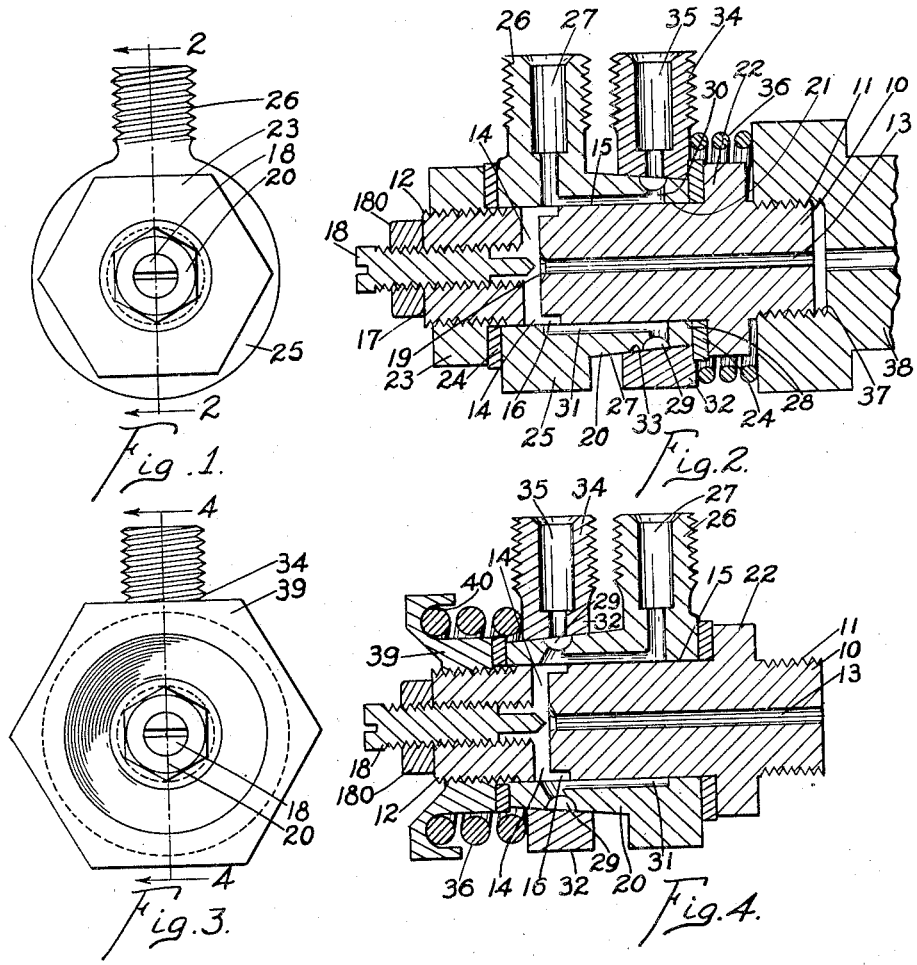
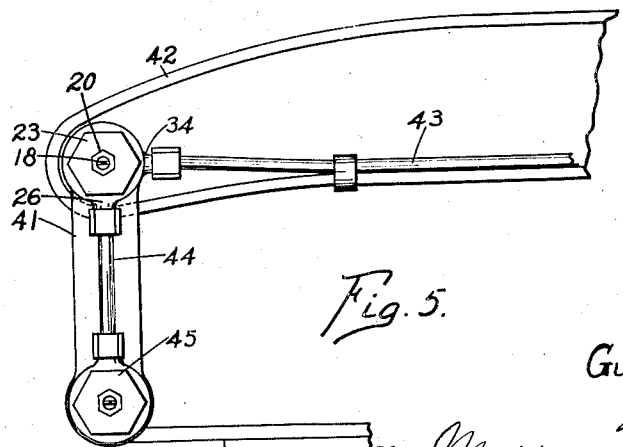
Inventor
Gus. A. Jamerson,
By Murray and Gugelter
Attorneys Patented Nov. 6, 1928.

1,690,636

UNITED STATES PATENT OFFICE.

GUS A. JAMERSON, OF CINCINNATI, OHIO, ASSIGNOR TO MAX STERN, OF CINCINNATI, OHIO.

LUBRICATOR.

Application filed November 19, 1925. Serial No. 70,156.

This invention relates to lubricators of the type adapted to use in force feed chassis lubricating systems and has for an object the provision of a device whereby a supply of lubricant may be conveyed from one part of an automobile chassis to another relatively movable part of said chassis.

Another object is to provide a device of this kind by means of which a supply of lubricant under pressure may be conveyed under adjustment to one bearing while other lubricant from the same source may be conveyed through the device to another bearing or part of a chassis having movement relatively to the first mentioned bearing.

A further object of the invention is to eliminate the usual packings in devices of this general character.

Another object is to provide a device of this kind in which the moving parts are at all times oil tight and which parts automatically adjust themselves in use to prevent leakage.

These and other objects are attained by the means described herein and disclosed in the accompanying drawings, in which:

Fig. 1 is an elevational view of a preferred form of my invention.

Fig. 2 is a cross sectional view taken on line 2—2 of Fig. 1.

Fig. 3 is an enlarged end elevational view of a modified form of my invention.

Fig. 4 is a cross sectional view taken on line 4—4 of Fig. 3.

Fig. 5 is a fragmentary view of a portion of an automobile chassis equipped with a device embodying my invention connected with a force feed lubricating system.

The lubricator shown is adapted especially for use with force feed lubricating systems wherein a supply of lubricant under pressure is conveyed by means of a supply tube to a series of bearings, each of the bearings receiving a quantity of lubricant from the supply. The lubricator is used for such bearings of automobile chassis as may have movement relative to adjacent bearings or parts of the chassis and is so constructed as to permit the use of rigid supply tubes throughout the system.

The device comprises a stud 10 having external threads 11 and 12 at its opposite ends and having an axial bore 13 and one or more radial bores 14 communicating with the axial bore and with the outer wall 15 of the stud. An annular groove 16 is formed in wall 15 of the stud at outer ends of radial bores 14. The axial bore 13 is enlarged and internally threaded between the outer end 17 of the stud and the radial bores 14 to receive a needle point adjustment screw 18 which is adapted to enter a seat 19 surrounding the axial bore 13 at its point of communication with radial bores 14 for the purpose of controlling and regulating communication between the axial and radial bores. A suitable locking nut 180 serves to retain the screw 18 in adjusted position. A sleeve member 20 has a bore 21 for receiving the stud 10, a shoulder 22 on the stud 10 serving as an abutment against which one end of the sleeve 20 may bear. A nut 23 on the threads 12 at the end 17 of the stud 10 holds the sleeve against the shoulder 22, fibre washers 24—24 being interposed between the opposite ends of the sleeve 20 and the shoulder 22 and nut 23. Preferably the sleeve 20 is provided at one end with a shouldered or enlarged portion 25 from which extends a coupling nipple 26 provided with a bore 27 communicating with the bore 21 of the sleeve. The sleeve 20 has a tapered outer surface 27 extending from the shoulder 25 to the opposite end 28 of the sleeve. An annular groove 29 is cut into the tapered surface 27 of the sleeve 20 and radially extending bores 30 lead from the bottom of the groove to the interior of the sleeve where they communicate with an internal annular groove 31 cut out from the wall of the bore 21 in the sleeve and afford communication between the groove 29 in the sleeve and the annular groove 16 in the stud. It will be evident that the annular groove 31 may be omitted and that the groove 16, formed in the outer wall 15 of the stud, be widened instead. A second sleeve or collar 32 has a tapered bore 33 complementary to the tapered outer surface of the sleeve 20, and is mounted to rock on the tapered portion 27 of the sleeve. The collar has a coupling nipple 34, similar to the coupling nipple 26 on the sleeve, and the bore 35 in the nipple 34 opens into the annular groove 29 in the sleeve 20. A comparatively light coiled spring 36 encircles the stud and abuts against one side of the collar 32 and pushes it on the taper 27 so that an oil tight joint is provided between the tapered bore 33 of the collar and the tapered surface 27 of the sleeve. At the same time these parts are capable of movement relatively to each other and to the stud.

In the preferred form, as shown in Fig. 2, the spring 36 abuts against the bearing or bolt to be lubricated and is tensioned by screwing the threads 11 of the stud into the threaded hole 37 of the tapped oil hole which normally receives a grease cup or other lubricator fitting. In Fig. 2, the device is shown operatively connected to a shackle bolt 38.

In the modified structure shown in Fig. 4, the parts are the same as those shown in Fig. 2 with the exception of the nut 23, which is replaced by a special nut 39 having a grooved seat 40 formed therein for the reception of the spring 36. In this form, the tension of the spring 36 is adjusted by means of the special nut 39. Also in the modification shown in Fig. 4, the position of the sleeve 20 is reversed so that the rotatable collar 32 and the spring 36 are positioned at the opposite end of the stud 10 from that shown in Fig. 2.

The lubricator is adapted for use upon such bearings of an automobile chassis as may have bodily movement relative to adjacent parts of the chassis to which an oil supply tube is secured. For example, it may be used to lubricate the tie rod bearings and king pin bearings and various other parts of the running gear and at the rear shackle connections, as shown in Fig. 5. In Fig. 5 it should be noted that the lubricator described above is employed only at the upper shackle bolt passing through spring hangers 41 and the end of the channel member 42 of the chassis. In installing a force feed lubricating system, a rigid supply tube 43 is carried along and clamped to the channel 42 and the end of the tube is connected to the coupling nipple 34, the coupling nipple 26 being connected by another section of tube 44 to a single lubricator 45 connected to the lower shackle bolt at the bottom of the spring hanger 41.

From the foregoing, it will be seen that when the spring hanger 41 and the shackle bolts connected therewith are moved relatively to the channel member 42 of the chassis, the collar 32 and stud 10 will maintain a fixed position relatively to the channel member 42, while the sleeve 20 will move with the spring hanger rocking on the stud 10 and in the tapered bore of said collar. The spring 36 at all times tends to urge the collar 32 upwardly on the tapered surface 27 of the sleeve so that the swivel joint thus formed is always kept oil tight, thereby eliminating the necessity for packing washers which would soon be destroyed by constant wear.

In the event that it is found advisable to terminate the oil supply line 43 at the shackle bolt, the coupling nipple 26 and the hole 27 in the sleeve may be plugged or the structure of the sleeve may be simplified by omitting the same.

In using the device the parts are assembled as shown. Assuming that the device is to be applied to a shackle bolt, the threaded end of the stud 10 is screwed into the usual recess provided in the end of the shackle bolt. The nipple 26 is adjusted into suitable alinement with the supply tube 43 and is coupled to it. The nipple 28 likewise is alined with and coupled to the tube 44 which leads to the lubricator 45 for the lower shackle bolt. In making these adjustments the sleeve and collar are rocked on the stud into the desired positions. When the installation of these parts has been completed the nut 23 may be further tightened if desired. Assuming that the lubricator is used in a force speed lubricating system, oil under pressure passes through the supply tube 43 through the bore 35 in the coupling nipple 34, and collar 32, into the annular groove 29 in the sleeve 20, and thence through the radial bores 30 in the sleeve to the annular groove 31 in the wall of the bore 21 of the sleeve. From the groove 31 part of the oil flows through the annular groove 16 in the stud and the radial bore 14 into the axial bore 13 and then to the shackle bolt or bearing to be lubricated. As previously explained, communication between the radial bores 14 and axial bore 13 may be regulated by the set screw 18 so that a regulated quantity of lubricant may be apportioned to the individual bearing or bolt in accordance with its requirements. Only a portion of the oil flows into the axial bore 13 of the stud, the remainder being forced through the coupling nipple 26, and the tube 44, to other bearings to be lubricated. It should be noted that the device is operative in all positions of the coupling nipples 26 and 34 and regardless of any relative movement which may occur between the collar, sleeve or stud.

While I have herein shown and described preferred embodiments of my invention, it will be understood that the invention may be embodied in other forms without departing from the spirit or scope thereof.

What I claim is:

1. In a device of the class described the combination with a stud having an axial bore and a radial bore communicating with the axial bore, a sleeve mounted on the stud and having an outer surface tapered toward one end of the sleeve, the sleeve having a passage therein providing communication between the radial bore in the stud and the exterior of the sleeve at points spaced apart longitudinally thereof, a collar having a tapered bore complementary to the tapered surface of the sleeve and rotatably mounted thereon, said collar having a hole through the wall thereof for providing communication between its exterior and one of said points on the sleeve, means for securing the sleeve on the stud, and means for yieldingly pressing the collar toward the larger end of the sleeve.

2. In a device of the class described the combination with a stud having a passage therethrough communicating at its opposite ends with the end of the stud and the side thereof, an exteriorly tapered sleeve having a longtitudinal bore therethrough for receiving the stud and having a passage therein providing communication between a passage in the side of the stud and spaced apart outlets on the exterior of the sleeve, a collar rotatably mounted on the tapered portion of the sleeve and having a perforation in the wall thereof communicating at its opposite ends with one of said outlets in the sleeve and with the exterior of the collar, and means for yieldingly resisting longitudinal movement of the collar on the sleeve and permitting substantially free rotation of the collar.

3. In a device of the class described the combination of a stud, a tapered sleeve carried by the stud, a collar rotatably mounted on the tapered sleeve, means for securing the sleeve to the stud, and means for yieldingly retaining the collar on the sleeve, the stud, sleeve and collar having passages therethrough for providing communication between the exterior of the sleeve and the interior of the stud and between the exterior of the sleeve and the exterior of the collar.

4. In a device of the class described the combination of a stud, a tapered sleeve carried by the stud, a collar rotatably mounted on the tapered sleeve, means for securing the sleeve to the stud, means for yieldingly retaining the collar on the sleeve, the stud, sleeve and collar having passages therethrough for providing communication between the exterior of the sleeve and the interior of the stud and between the exterior of the sleeve and the exterior of the collar, and means for controlling communication between the exterior of the sleeve and the end of the stud.

5. In a device of the class described the combination of a shouldered stud having an axial bore and a communicating radial bore, a sleeve mounted on the stud, means for securing the sleeve on the stud, the sleeve being provided with longitudinally spaced radial bores and having an external annular groove communicating with one of said radial bores and having an internal groove providing communication between the bores, a collar rotatably mounted upon the sleeve and having a radial perforation through the wall thereof providing communication between the exterior of the collar and the exterior annular groove in the sleeve, and means for yieldingly retaining the collar upon the sleeve.

6. In a device of the class described, the combination of a stud, a sleeve carried by the stud and having a tapered outer surface, a collar rotatably mounted on said tapered surface, the sleeve having radial holes spaced along its length, the collar having a passage through the wall thereof communicating with one of said radial holes, and the sleeve and stud being arranged to provide communication between said spaced holes in the sleeve.

7. In a device of the class described the combination of a stud, a sleeve carried by the stud and having a tapering section on its exterior wall, means for clamping the sleeve to the stud, a collar rotatably mounted on the tapered wall of the sleeve, the sleeve, collar and stud having communicating passages therein for providing communication between the interior of the stud and the exterior of the sleeve and collar and spring means for retaining the collar in rotatable engagement upon the tapering outer wall of sleeve and precluding leakage between the sleeve and collar.

8. In a lubricating device, the combination of a stud, two sleeve-like members encircling said stud and mounted to rock about the axis of said stud relatively to each other and to said stud, said members being constructed for external connection to independent oil conductors and having internal oil conducting passages in constant communication with each other notwithstanding the rocking movement of said members, and means for holding said members in cooperative relationship to each other and to said stud.

9. In a lubricating device, the combination of a stud, two sleeve-like members encircling said stud and mounted to rock about the axis of said stud relatively to each other and to said stud, said stud and said members all having oil conducting passages in constant communication with each other notwithstanding said rocking movement, and both of said members being constructed for external connection to independent tubes for conducting oil to or from said device, the oil conducting passage in said stud leading through the stud, and means for holding said members and said stud in cooperative relationship to each other.

10. In a lubricating device, the combination of a stud, two sleeve-like members encircling said stud and mounted to rock about the axis of said stud relatively to each other and to said stud, said stud and said members all having oil conducting passages in constant communication with each other notwithstanding said rocking movement, and both of said members being constructed for external connection to independent tubes for conducting oil to or from said device, the oil conducting passage in said stud leading through the stud, adjustable means for controlling the distribution of oil between certain of said passages, and means for holding said members and said stud in cooperative relationship to each other.

11. In a lubricating device, the combination of a stud, a sleeve mounted to rock on said stud and having a tapered outer surface, a collar internally tapered to fit on said surface and mounted on said sleeve to rock relatively thereto, said sleeve, collar and stud having oil conducting passages leading therethrough and all in constant communication with each other notwithstanding said rocking movements, said sleeve and collar being constructed for connection to external tubes for conducting oil to or from said device, means for holding said sleeve, collar and stud in cooperative relationship to each other, said means including a device for pressing said collar yieldingly toward the larger end of said tapered sleeve, and an adjustable screw threaded member for controlling the distribution of the oil in said device.

In testimony whereof, I have hereunto subscribed my name this 17th day of November, 1925.

GUS A. JAMERSON.